(12) United States Patent
Sharma et al.

(10) Patent No.: US 11,176,022 B2
(45) Date of Patent: Nov. 16, 2021

(54) HEALTH DIAGNOSTICS AND ANALYTICS FOR OBJECT REPOSITORIES

(71) Applicant: Bank of America Corporation, Charlotte, NC (US)

(72) Inventors: Ramesh Sharma, Toronto (CA); Alexander Arkadyev, Thornhill (CA)

(73) Assignee: Bank of America Corporation, Charlotte, NC (US)

( * ) Notice: Subject to any disclaimer, the term of this patent is extended or adjusted under 35 U.S.C. 154(b) by 11 days.

(21) Appl. No.: 16/728,075

(22) Filed: Dec. 27, 2019

(65) Prior Publication Data

US 2021/0200833 A1 Jul. 1, 2021

(51) Int. Cl.
| | | |
|---|---|---|
| *G06F 11/36* | (2006.01) | |
| *G06F 16/958* | (2019.01) | |
| *G06F 16/955* | (2019.01) | |
| *G06F 16/954* | (2019.01) | |
| *G06F 16/9035* | (2019.01) | |

(52) U.S. Cl.
CPC ...... *G06F 11/3664* (2013.01); *G06F 16/9035* (2019.01); *G06F 16/954* (2019.01); *G06F 16/955* (2019.01); *G06F 16/972* (2019.01)

(58) Field of Classification Search
None
See application file for complete search history.

(56) References Cited

U.S. PATENT DOCUMENTS

| | | | |
|---|---|---|---|
| 7,958,495 | B2 | 6/2011 | Kelso |
| 8,677,320 | B2 | 3/2014 | Wilson et al. |
| 9,189,377 | B1 * | 11/2015 | Arkadyev ........... G06F 11/3688 |
| 9,317,398 | B1 | 4/2016 | Masse et al. |
| 9,336,126 | B1 | 5/2016 | Masse et al. |
| 9,430,361 | B1 | 8/2016 | Masse et al. |
| 9,483,390 | B2 | 11/2016 | Chaturvedi et al. |
| 9,697,110 | B1 | 7/2017 | Arkadyev |

(Continued)

OTHER PUBLICATIONS

"Creating Object Repository in Selenium WebDriver: XML & Properties File," https://www.guru99.com/object-repository-selenium.html, Guru 99, Retrieved on Nov. 18, 2019.

(Continued)

*Primary Examiner* — Wei Y Zhen
*Assistant Examiner* — Lanny N Ung
(74) *Attorney, Agent, or Firm* — Weiss & Arons LLP; Michael A. Springs, Esq.

(57) ABSTRACT

A method for checking a plurality of user interface ("UI") controls implemented in a UI map of a web application is provided. The method may include creating the UI map. The UI map may include the plurality of UI controls and corresponding locator values, each stored in an object repository ("OR"). The UI map may also include attributes associated with the UI controls. The method may include analyzing and checking the structure of the UI map prior to testing the web application. The analyzing may include checking the structure of the UI controls and of the associated attributes. The analyzing may also include searching for duplicate locator values assigned to the UI controls. Checking the structure and searching for duplicate locators may be performed at each of the root level, browser level and page level of the UI map.

16 Claims, 8 Drawing Sheets

(56) References Cited

U.S. PATENT DOCUMENTS

| | | | |
|---|---|---|---|
| 9,846,636 B1 | 12/2017 | Masse et al. | |
| 10,097,565 B1 | 10/2018 | Masse et al. | |
| 10,380,011 B2 | 8/2019 | Yashayeva et al. | |
| 10,387,292 B2 | 8/2019 | Budurean et al. | |
| 2007/0294586 A1* | 12/2007 | Parvathy | G06F 11/3672 |
| | | | 714/38.14 |
| 2012/0174075 A1 | 7/2012 | Carteri et al. | |
| 2013/0219307 A1 | 8/2013 | Raber et al. | |
| 2014/0229920 A1 | 8/2014 | Rossi | |
| 2015/0234735 A1 | 8/2015 | Chaturvedi et al. | |
| 2017/0185509 A1* | 6/2017 | Arkadyev | G06F 11/3696 |
| 2017/0300405 A1 | 10/2017 | Yashayeva et al. | |
| 2020/0174917 A1* | 6/2020 | Patel | G06F 11/3684 |

OTHER PUBLICATIONS

"Locators in Selenium," https://www.toolsqa.com/selenium-webdriver/locators/, ToolsQA.com, Retrieved on Nov. 14, 2019.

"Java Type Casting," https://www.w3schools.com/java/java_type_casting.asp, w3schools.com, Retrieved on Dec. 26, 2019.

"Locators in Selenium IDE: CSS Selector, DOM, XPath, Link Text, ID," Guru 99, https://www.guru99.com/locators-in-selenium-ide.html, Retrieved on Nov. 14, 2019.

Bas, "Building and Using an Object Repository in Selenium Webdriver," https://www.ontestautomation.com/building-and-using-an-object-repository-in-selenium-webdriver/, OnTestAutomation, Apr. 1, 2014.

"Type Conversion in Java with Examples," https://www.geeksforgeeks.org/type-conversion-java-examples/, GeeksforGeeks, Retrieved on Dec. 26, 2019.

"UI Maps or Object Repository Using Properties File," https://www.seleniumeasy.com/selenium-tutorials/ui-map-object-repository-using-properties-file, Retrieved on Nov. 18, 2019.

\* cited by examiner

1002

| KEY<br>UI CONTROL | VALUE<br>LOCATOR VALUE |
|---|---|
| CONTROL A | LOCATOR 1 |
| CONTROL B | LOCATOR 2 |
| CONTROL C | LOCATOR 1 |
| CONTROL D | LOCATOR 3 |
| CONTROL E | LOCATOR 2 |
| CONTROL F | LOCATOR 4 |
| CONTROL G | LOCATOR 3 |
| CONTROL H | LOCATOR 1 |
| CONTROL I | LOCATOR 2 |

1004

| KEY<br>LOCATOR VALUE | VALUE<br>UI CONTROL |
|---|---|
| LOCATOR 1 | CONTROL A; CONTROL C; CONTROL H |
| LOCATOR 2 | CONTROL B; CONTROL E; CONTROL I |
| LOCATOR 3 | CONTROL D; CONTROL G |
| LOCATOR 4 | CONTROL F |

FIG. 10

HEALTH DIAGNOSTICS AND ANALYTICS FOR OBJECT REPOSITORIES

FIELD OF TECHNOLOGY

Aspects of the disclosure relate to automation testing of user interface ("UI") controls stored in an object repository ("OR".)

BACKGROUND OF THE DISCLOSURE

Ensuring seamless performance of user interfaces is a key factor in maintaining customer relationships and increasing customer satisfaction. A large part of a user interface's performance is the responses of selectable user interface ("UI") controls.

Computer code that implements a UI may include automation processes. An automation process may be triggered by a user action. For example, in response to a user selection, the code may display additional options for user selection. A UI may include a plurality of UI controls to provide user functionality. A UI may include a web button, that when selected by a user, performs an action responsive to the user selection. A UI control may display a popup window in response to the user selection.

Computer code implementing a UI may be tested before the UI is deployed. Using automation testing a UI may be tested against real-life scenarios that may be experienced by a user. Automation testing may verify that the UI performs as designed and as expected. Automation testing may include verifying that the UI presents information to a user that the user expects, is relevant to the user, and is responsive to the user's action.

All the controls included in a UI may be defined and stored in an Object Repository ("OR"). The OR is a centralized location for storage of all UI controls independent of other components of the web application. Each UI control has a locator value assigned to the UI control. User selection of a control may trigger a computational action based on the locator value assigned to the UI control.

However, automation testing may not be configured for testing the accuracy of the locator values assigned to each of the UI controls. When the locator value is not correct, the UI control may trigger an action that may retrieve a value that seems to be accurate but may not return what is expected.

It would be desirable, therefore, to have systems and methods, to check the accuracy of the locator values assigned to the UI controls.

It would be further desirable to test the UI controls independent of, and prior to, testing of the web application.

SUMMARY OF THE DISCLOSURE

Aspects of the disclosure relate to an object repository ("OR") testing system. The OR testing system may be configured for preemptively checking, within a user interface ("UI") automated testing environment, a plurality of UI controls implemented in a web application. The web application testing system may include an OR. The OR may store the plurality of UI controls. The OR may also store the corresponding attributes associated with each UI control.

UI controls may implement a functionality of a UI. User selection of a UI control may trigger a computational action, may open a pop-up window, may sort a list or may prompt a user for a further action. Illustrative control types may include web element, web list, web edit, web button, link, image, and web check box.

The OR testing system may also include a UI map. The UI map may display the plurality of UI controls and corresponding attributes on a UI. Each UI map may include key-value pairs. Each key in the pair may be a UI control included in the webpage. Each value in the pair may be a locator value associated with the UI control. Each locator value may be a unique locator value. In some embodiments, the unique locator value may be manually selected. In other embodiments, the unique locator value may be automatically generated.

The locator value may be a back-end pointer for the UI control. The back-end pointer may direct the UI control to different types of locations.

In some embodiments, the UI map may correspond to a first webpage of the web application. The UI map manager may be configured to create an additional UI map for each webpage of the web application.

The UI map manager may manage the UI controls stored in the OR. The UI map manager may be stored on a non-transitory machine readable memory having computer readable program code embodied therein. The system may include one or more processors configured to execute the computer readable program code, and a system bus configured to transfer the computer readable program code from the machine readable memory to the processor. The computer readable program code when executed by the one or more processors is configured to search each UI map stored on the database for one or more duplicate locators.

The UI map manager may be configured to generate a first list. The first list may include a plurality of tuples. Each tuple may include one of the key-value pairs.

The UI map manager may be configured to iterate through each tuple in the list to determine whether a locator value in a current tuple matches a locator value in one of a previous tuples. If the locator value in the current tuple does not match the locator value in one of the previous tuples, the UI map manager may be configured to proceed to a subsequent tuple in the list.

When it is determined that the locator value in the current tuple does match the locator value in one of the previous tuples, the UI map manager may be configured to highlight, on the UI map, the current tuple and the previous tuple including the matching locator value. The UI map manager may be further configured to record the UI controls that include matching locator values as a record in a second list. The UI map manager may record the matching locator value and the corresponding UI controls as the record. The corresponding UI controls may be the UI control from the current tuple and the UI control from the previous tuple that includes the matching locator value.

Prior to the recording of the matching locator value and the associated UI controls that include the matching locator value, the UI map manager may be further configured to check the second list. The checking of the second list may determine whether a previously-recorded record comprising the matching locator value is already recorded. When the previously-recorded record comprising the matching locator value is found, the UI map manager may be configured to add the UI control included in the first part of the current tuple to the previously-recorded record.

The UI map manager may also include a UI map editor. When a revision is made within the UI map editor, the UI map manager may be configured to automatically regenerate, in real-time, the first list. Following the regenerating of the first list, the UI map manager may be configured to repeat the searching. The repeating of the searching may be to re-search for duplicate locator values in the OR based off of the regenerated first list.

The UI map manager may also be configured to check a structure of the OR based off of the UI map. The checking may include confirming that a locator value is provided for each UI control. The checking may also include confirming that each of the first UI map, and each additional UI map, includes one UI control where the category type is defined as a primary UI control of the webpage.

The UI map editor may display the values for each attribute. The UI map manager may be configured to check the structure of the UI map via the UI map editor.

The UI map may include a map of the web application at a root level, a browser level and a page level. Each of the root level, browser level and page level may correspond to a level of the web application. The UI map manager may be further configured to enable searching for duplicate locators at each of the root level, browser level and page level.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 10 shows an exemplary diagram in accordance with principles of the invention.

DETAILED DESCRIPTION OF THE DISCLOSURE

Figure 1:
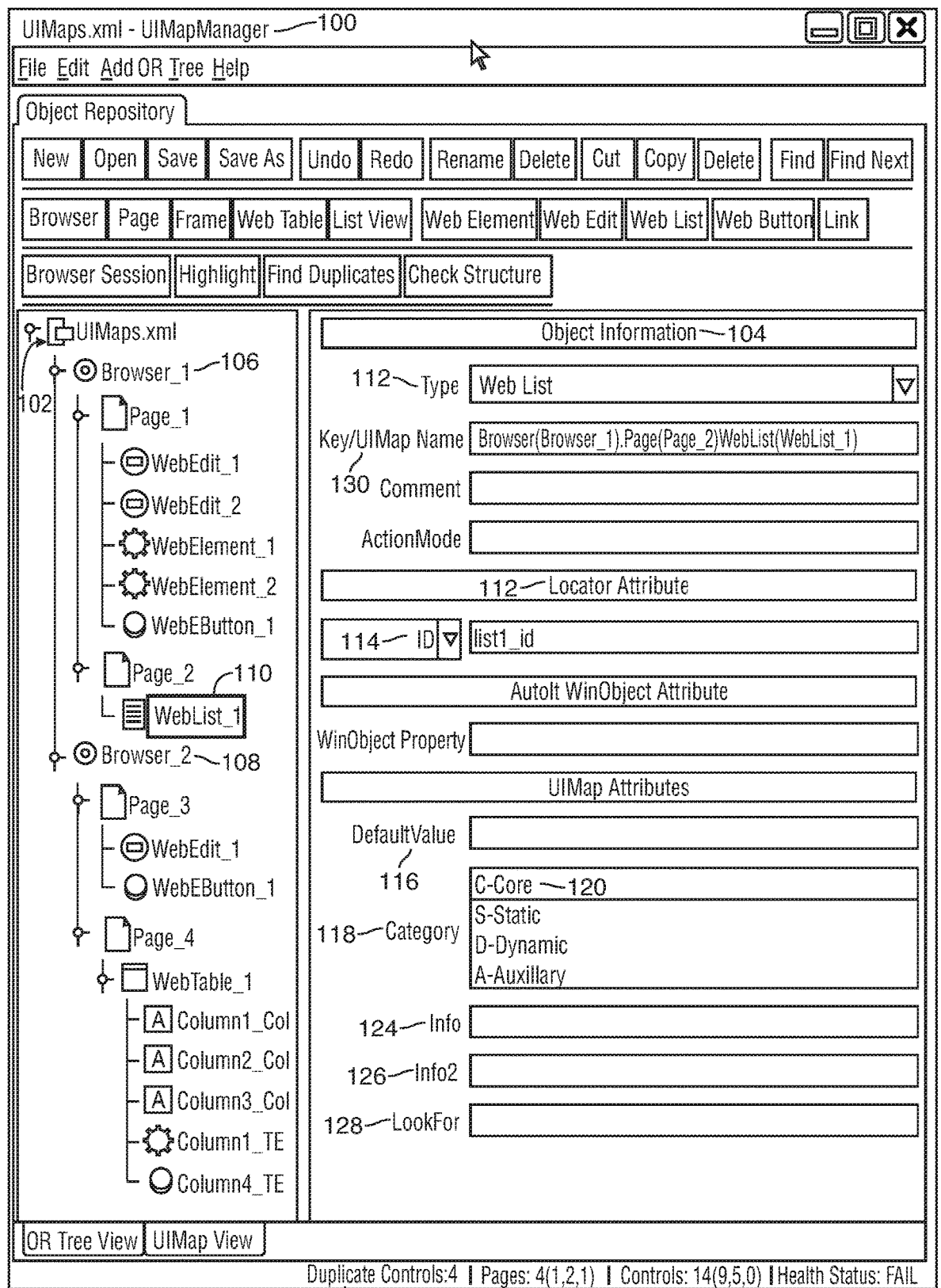
FIG. 1 shows an exemplary UI in accordance with principles of the invention.

Systems and methods are provided for testing the UI controls used to implement a user interface ("UI") of a web application. The web application may be an application under test ("AUT").

The method disclosed may preemptively check, within a UI automated testing environment, a plurality of UI controls implemented in the AUT.

The method may enable testing the accuracy of the locator values assigned to the UI controls prior to the testing of the AUT. The method may also enable validating a health of the OR. Methods described herein may be performed prior to the testing of the AUT, thereby enhancing users' experience and saving significant time and efforts during test executions.

The OR may be a storage location for all objects of the web application. Each web application may include numerous web elements. The objects may be the locators used to uniquely identify the web elements. The locator value may be the back-end pointer to a type of location. Each web element may be referred to herein alternatively as a "control."

A UI control may implement a functionality of the UI. User selection of a UI control may trigger a computational action, may open a pop-up window, may sort a list or may prompt a user for a further action.

The method may include creating a UI map of the plurality of UI controls and corresponding attributes associated with each UI control. The plurality of UI controls and corresponding attributes may be stored in an object repository ("OR"). The UI map may serve as a basis for one or more automation testing scripts for testing the web application. The UI may map a structure of the web application.

The method may also include accessing the plurality of UI controls and corresponding attributes via a UI map manager associated with the UI map. The UI map manager may be an object repository tool to manage objects and UI controls of a web application under test and to support test automation based on descriptive UI maps. The UI map manger may be developed in Java Swing. The UI map manager may be shipped as an executable .jar file. An object repository file may be created and saved as an extensible markup language ("XML") file. This file may be stored in a folder associated with a project within the UI map manager. The UI map may be a user interface of the object repository file.

The UI map manager may enable making changes to the metadata associated with the UI controls that are stored in the OR. Upon execution of the changes, the UI map manager may update the OR.

Methods may include creating a UI Map as a basis for one or more automation testing scripts. An automation testing script may include computer code that mimics a human user's input, or other scenario, with respect to an application-under-test (hereinafter, "AUT"). An automation testing script may monitor a response of the AUT to a test scenario. The automation testing script may monitor an expected response of the AUT to test inputs.

A UI Map may include a "blueprint" of a computer application such as a UI. The UI Map may list UI controls included in the UI. The UI Map may include properties of controls used to implement the UI and relationships between various UI controls. A UI Map may be constructed based on a logical flow of an algorithm implemented by the UI.

The UI controls may be defined and stored in an object repository ("OR".) The OR enables segregating the controls from the test cases. If a locator value of a UI control needs to be changed, the change may only need to be made in the OR and not within each test case.

A computer programmer, or a team of programmers, may design a UI by creating a design document. The design document may describe a logical flow of one or more functions of the UI. The design document may describe controls that may be deployed within the UI to implement the desired functionality.

A UI Map may describe a UI control and/or plurality of controls. The UI Map may include properties and functions of the UI control. A UI Map may describe one or more properties of a UI control. For example, for a UI control, the UI Map may include the following properties of the UI control:

Is the control dynamic or static?

What control(s) may be used to identify a UI webpage?

What control(s) may represent messages, labels, or other UI functionalities?

Default values of the controls (if any).

Each UI Map may describe a UI webpage or a group of functionally or logically linked controls available on a UI webpage. A UI Map may link to other UI Maps.

The metadata may include the webpage or other UI modules that utilizes the UI control under test. The metadata may include a name of a UI control. The name may identify the UI control within the UI module.

The metadata may include a control type associated with the UI control. The control type may correspond to a function of the UI control. Illustrative control types include web element, web list, web edit, web button, link, image, and web check box. Computer code implementing the automation test scenario may read the metadata stored within the UI Map and use the metadata to implement the automation test scenario.

The metadata may include a category associated with the UI control. Illustrative categories include static, dynamic, auxiliary, core, descriptive programming (control identified by description), message and/or label. The category of a UI control may be used to define a behavior of a control within a UI module. For example, a static control/column is expected always to be on the page/table.

The metadata may include a default value for a UI control on the webpage. The default value may be a property used to initialize a UI control. For example, a default value may be text, such as a label, displayed to a user within the UI control. The text may explain a functionality or purpose of the control. The default value may be a default option displayed by the UI control.

The method may also include storing the UI map in a database associated with the AUT.

The UI map may be a first UI map corresponding to a first webpage of the web application. The method may also include creating an additional UI map for each webpage of the AUT.

Furthermore, the method may include searching for duplicate locator values in the OR. The searching may be performed prior to a testing of the AUT.

Since web applications include hundreds of controls, the locator values assigned to each of the controls may very often be defined incorrectly. Programmers may create a number of controls at a time and copy and paste data with the intention of correcting the necessary data. However, it often occurs that the incorrect data is not corrected.

When an AUT is being tested, the UI controls that include an incorrect locator value may seem to be functioning however they may not be directing the user to the correct location. Therefore, testing the UI controls prior to testing the AUT, may enable a more accurate web application testing.

In one embodiment, checking for duplicate controls may include generating a single-valued map. The single-valued map may include key-value pairs. Each key-value pair may include one key and one value. Each key may be a UI control from the plurality of UI controls. The UI control may be a unique UI control. Each value may be a locator value corresponding to the UI control.

The method may include reversing the key and the value for each key-value pair. For each key-value pair, the key, in the key-value pair, may be replaced with the locator value in the key-value pair. For each key-value pair, the value, in the key-value pair, may be replaced with the UI control.

Following the reversing, the method may include type casting. The type casting may enable assigning one data type to another data type. In this embodiment, the method may include type casting the single-valued map into a multi-valued map. The multi-valued map may be configured to accept multiple values for each key.

The method may also include condensing the multi-valued map. The condensing may enable each key being unique to the multi-valued map. Each value may include one or more unique UI controls.

The condensing may include maintaining a unique key for each of the keys included in the multi-valued map. For each unique key, the condensing may map one or more corresponding values to the unique key. For example, if more than one control corresponds to the same locator value, the multi-valued map may combine all the controls to be multiple values for one key. This may eliminate duplicates from being repeated in more than one key-value pair. Additionally, this may enable identifying duplicate controls more efficiently.

It should be appreciated that the type casting may be performed in Java® or any other suitable computer programming language.

In some embodiments the single-valued map may be a container. The multi-valued map may also be a container. An instantiated single-valued map—i.e. a single-valued map that has been assigned memory and includes data—may be type casted into a multi-valued map. It should be appreciated that the single-valued map may become the multi-valued map thereby removing the need for maintaining, simultaneously, two containers—i.e., both a single-valued map and a multi-valued map. When type casting into the multi-valued map, the multi-valued map may enable accepting multiple values for each key in each key-value pair.

In certain embodiments, the single-valued map may be a first container. The key-value pairs in the first container may be reversed so that the key, in each key-value pair, may be replaced with the locator value and the value, in each key-value pair, may be replaced with the UI control. Following the reversing, the key-value pairs may be exported to a second container. The second container may be the multi-valued map. When exported to the second container, the multi-valued map may automatically condense the key-value pairs by enabling each value, for each key-value pair, to include one or more UI controls.

It should be appreciated that the condensing may be a resource saving mechanism. Single-valued maps may only accept one key and one value. In this embodiment, one control name may be the 'key' and one locator value may be the 'value.' When there is one locator value corresponding to more than one locator name, the duplicate key-value pairs may each be stored separately. This creates a relatively more lengthy table.

Because multi-valued maps may be configured to accept more than one value for each key, type casting the single-valued map into the multi-valued map may automatically condense the length of the table. The condensing described may enable saving resources and may also enable identifying duplicate controls more efficiently.

In another embodiment, the method for searching for duplicate locator values may include generating a first list. The first list may include a plurality of tuples. Each tuple may include a first part. The first part of the tuple may include a UI control from the plurality of UI controls. The UI control may include a UI control name. The second part of the tuple may include the corresponding locator value associated with the UI control.

The method may include executing an algorithm to iterate through each tuple in the list to determine whether a locator value in a current tuple matches a locator value in one of a previous tuples. The algorithm performed may start at the first tuple in the list. The first tuple does not require checking since no previous tuples exist.

Following the first tuple in the list, for every subsequent tuple, the algorithm performed may enable determining if the locator value in the current tuple matches to a locator value in one of the previous tuples. If the locator value in the current tuple does not match a locator value in one of the previous tuples, the method may include proceeding to a subsequent tuple in the list.

When the locator value in the current tuple does match the locator value in one of the previous tuples, the method may include highlighting, on the UI map, the current tuple and the previous tuple comprising the matching locator value.

The method may also include recording the matching locator value, the control from the current tuple and the UI control from the previous tuple comprising the matching locator value as a record in a second list.

Following the recording, the method may include identifying which one of the locator values from the current tuple and from the previous tuple is incorrect. Following the identification, the method may include overwriting the incorrect locator value with a unique locator value.

On overwriting, the method may include, automatically committing the unique locator value to the OR. The committing may include saving the unique locator value to the OR and automatically reflecting the correction on the UI map.

The method may further include automatically, and in real-time, reflecting the corrections on the UI map.

When any revision to the attributes of the UI controls are performed in the UI map manager, the method may include automatically regenerating, in real-time, the first list. The method may also include repeating the searching for duplicate locator values based off of the regenerated first list.

For each time a matching locator value is found in a previous tuple, the method may include first checking the second list of previously-recorded records for a previously-recorded record including the matching locator value. If a previously-recorded record is found that includes the matching locator value, the method may include adding the control included in the first part of the current tuple to the previously-recorded record.

In some embodiments, in addition to checking for duplicate locator values, the method may also include checking a structure of the UI map. Checking for the structure may include validating the health of the structure by confirming that a locator value is provided for each UI control. Additionally, checking the structure may include confirming that each of the first UI map and each additional UI map includes one UI control where the category type is defined as a primary control of the webpage.

The UI map manager may also be configured to display, in real-time, an interactive health validation summary. The summary may include displaying a total amount of UI controls including duplicate locator values. The summary may also include displaying a total amount of identified errors associated with the structure of the OR. The summary may further include displaying a total amount of identified warnings associated with the structure of the OR.

The UI map may include a root level, a browser level and a page level. Each of the root level, browser level and page level may correspond to a level of the web application. The method may include enabling searching for duplicate locators at each of the root level, browser level and page level.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

Illustrative embodiments of apparatus and methods in accordance with the principles of the invention will now be described with reference to the accompanying drawings, which form a part hereof. It is to be understood that other embodiments may be utilized and that structural, functional and procedural modifications may be made without departing from the scope and spirit of the present invention.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

FIG. 1 shows an illustrative UI map manager 100. UI map manager may include a UI map 102 displaying a portion of the UI controls. UI map 102 may be a UI of the controls stored in the OR.

UI map 102 may include a UI map for each of the browser views associated with the web application under test ("AUT".) There may be a UI map for 'browser_1' as shown at 106. There may be a UI map for 'browser_2' as shown at 108. The data associated with each of the UI controls listed in the UI map 102 may be viewed, updated and revised within the UI map manager editor 104.

The UI map manager 100 is a tool that enables one or many computer programmers to access and change the metadata associated with the UI controls of the AUT. Multiple users can access the UI map manager 100 in order to make changes to the UI controls.

The data displayed within the UI map editor 104 may be associated with a selected UI control in the UI map 102. In this illustrative example, the selected UI control is the control titled 'WebList1' as shown at 110. The data displayed in editor 104 may be attributes corresponding to the 'WebList1' control 110. The metadata may include a control type corresponding to a function of the UI control. 'WebList1' 110 may be defined as a web list, as shown at 112. The type of UI control, as shown at 120, may be selected from a list of other types of controls. The types of controls may include but are not limited to a web element, web list, web edit, web button, link, image, and web check box.

The metadata may include a name of the UI control identifying the control. The name selected for control 110 may be defined at 130. The metadata may also include the locator attribute defining a locator value for each of the controls. The locator value assigned to control 'WebList1' at 110 is 'list1_id', as shown at 114.

The UI map manager 100 may be used within an open-source framework. An open-source framework that may be used in accordance with the disclosure is the Selenium® open source framework. The framework locators may be of different types. The various types of locators may be selected within the UI map editor 104 as shown at 114. In this example, the type of location may be an ID. The other types of locators that may be supported may include, but may not be limited to, a name, xpath, link, text, css and class.

The metadata may include a default value for a UI control on the webpage. "DefaultValue" 116 of UI Map 102 contains default values for each UI control. "Info" 124 and "Info2" 126 may include additional information, such as an override action that may be utilized for a specified UI control. "LookFor" shows UI controls or groups of UI controls (represented by a separate UI Map(s)) that may be initialized after performing some action on the current UI control.

"Category" 118 includes one or more of the following illustrative categories for each UI control: "C—core", "S—static", "D—dynamic", "A—auxiliary."

A "static" UI control/column is always expected to be present on a page/table. A "dynamic" UI control/column is conditional and may not be present on a page/table. A dynamic UI control/column may be present on a page/table in response to user action. In a preferred embodiment, for static and dynamic controls, the browser, page, control, control type fields are expected to be completed.

Auxiliary entries may be created at the control level. An "auxiliary" entry may not include a value for each available field. Such entries do not correspond to a single UI control of the AUT and are typically used to describe complex UI structures, such as tables. Exemplary auxiliary entries for a UI Map may include columnName_Col, columnName_TEL, RowItem and CellItem.

In accordance with principles of the invention, every page of the AUT includes at least one UI control where the category is defined as a 'core' category. Such control(s) could be used to uniquely identify the page and to confirm that the page is fully loaded.

The UI map manager 100 may be enabled to perform a health validation on the OR to assist users to find and fix errors pro-actively. In this illustrative diagram, the health validation may be an automatic health validation. The UI map manager 100 may also be enabled to perform an interactive health validation. The interactive health validation may be shown in FIG. 4.

Table 1 shows exemplary errors that may be identified when performing an automatic and/or interactive health validation.

TABLE 1

| GENERIC |
| --- |

| | |
| --- | --- |
| 1 | No locator value provided. Please provide the locator value. |
| 2 | No CORE controls found for this page. There should be at least one CORE control for each page. |
| 3 | The following controls on this page have errors. |
| 4 | Please define a valid Category. Category Values cannot be (C, A), (C, D), (S, D). |
| 5 | A control that is not supposed to be Auxiliary is marked as such. |

| LookFor |
| --- |

| | |
| --- | --- |
| 6 | LookFor invalid target string {Invalid String}. |
| 7 | LookFor attribute contains invalid wait time {Invalid Wait Time} in {Control Name, Invalid Wait Time}. Expected times are: SHORT_WAIT, MEDIUM_WAIT, LONG_WAIT and positive integers. |
| 8 | LookFor attribute contains unknown existence attribute {Invalid existence attribute} in {Control Name, Wait Time, Invalid existence attribute}. The expected attributes are Exist/Displayed/Visible, NotExist/NotDisplayed/NotVisible. |
| 9 | LookFor contains more than 3 parameters in {Control Name, Wait Time, Existence attribute, Other text}. |
| 10 | LookFor target with the Object Key {Browser(Value).Page(Value).WebElement(Value)} cannot be found in the repository. |
| 11 | LookFor target with the name {Invalid control/page name} cannot be found among controls on this page and among page names. |
| 12 | Unexpected LookFor format {Invalid format}. The expected format is: controlName1,waitTime1,[Existence];pageName1,waitTime2,[Existence]; |

| Web Table |
| --- |

| | |
| --- | --- |
| 13 | Parent node type for a table control is (Type other than WebTable). It should be WebTable. |
| 14 | _Col controls should be created as Auxiliary. |
| 15 | No _TE control found for the column control. |
| 16 | _TE controls should NOT be created as Auxiliary. Their type should reflect the type of controls in the table cell. |
| 17 | No _Col control found for the _TE control. |
| 18 | If a column has multiple TEs of the same type, all such TEs should have context locators. For XPath they should start with './'. Please provide such locators. |
| 19 | Unexpected table related error, please see the log for details. |
| 20 | If a XPath locator is provided for some _TE control, it should be a context XPath starting with './' |
| 21 | If a XPath locator is provided for RowItem or CellItem control, it should be a context XPath starting with './' |
| 22 | Please set Category for Table _Col and _TE controls to A-Auxillary. |
| 23 | Please set Category for Table _TEL controls to A-Auxillary. |
| 24 | Please set Category for Table RowItem and CellItem controls to A-Auxillary |

TABLE 1-continued

| | |
|---|---|
| 25 | Please provide the INFO value for WebTable Column control reflecting the column order in the table. |

Warning Messages

| | |
|---|---|
| 26 | LookFor attribute contains hard wait Number in {Control Name, Hard Wait Time}. For times longer than 10 seconds please use predefined constants SHORT_WAIT, MEDIUM_WAIT, LONG_WAIT. |
| 27 | LookFor target Object Key points to a control on a different page. Refer to that page as a whole and not to its individual controls. |
| 28 | No controls with LookFor found for this page. Typically LookFor should be set at least for one control on a page. |
| 29 | The following controls on this page have warnings. |

The system may also be enabled to check for duplicate locator values, automatically, upon OR load and/or upon any revision executed within the UI map manager 100.

When executing an update, change and/or revision within the UI map manager for one or more controls, the OR automatically gets updated to include the update, change and/or revision. Additionally, the system may automatically re-check for duplicate locator values. The system may automatically also check the structure of the OR.

The results for checking for duplicates, and checking the structure, may be displayed at 122. Automatically checking the structure may include checking within each attribute that is defined to be a required field, that the field includes a value. Additionally, checking the structure may include checking that at least one UI control per page of the AUT has a category defined to be a 'core' category. The errors that may be identified from an automatic performance of the checking of the structure and the checking of the duplicates may be identified by a color change of the name of the control listed in the UI map 102. Each of the UI controls that include an error may be shown in red. Each of the UI controls that have a warning may be shown in yellow. Each of the controls that are determined to be a duplicate may be shown in blue.

Additionally, when a UI control includes one of an error, warning, or duplicate, a tooltip may be displayed alongside the control name within the UI map 102 to further explain the issue. Illustrative examples are displayed in FIG. 2.

Figure 2:
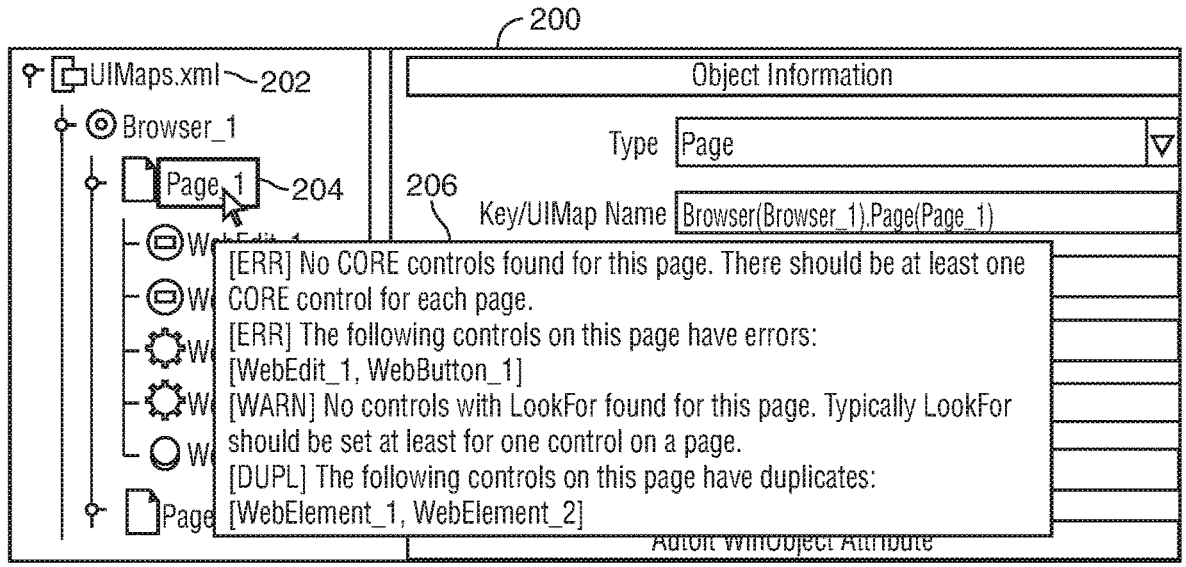
FIG. 2 shows an exemplary portion of a UI in accordance with principles of the invention.

FIG. 2 shows an illustrative portion of the UI map 202 within the UI map manager 200. Following a detection of one or more duplicate locator values, warning and/or errors, the system may be enabled to display a tooltip.

In this illustrative diagram, when a user scrolls over 'page_1', as shown at 204, all the errors may be displayed in the tooltip 206. Page tooltips may provide details about the page specific issues. Page tooltips may list problematic UI controls for the page.

The user can manually make the changes within the UI map manager 200 based on the errors displayed in the tooltip 206. As the user revises the metadata, the OR gets automatically updated and the displayed tooltip will be updated in real-time.

Figure 3:
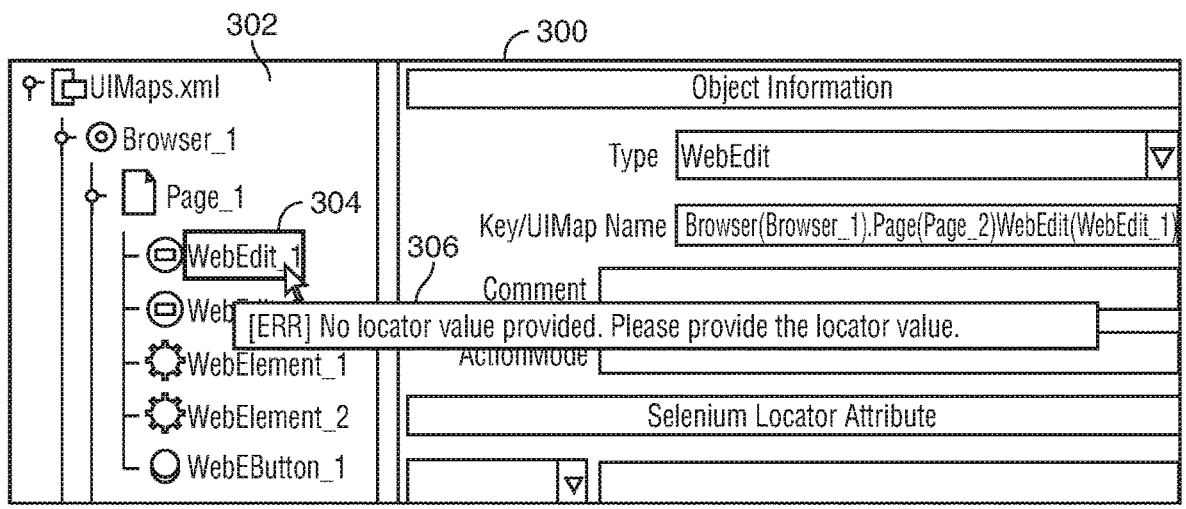
FIG. 3 shows an exemplary portion of a UI in accordance with principles of the invention.

FIG. 3 shows another illustrative portion of a UI map 302 within the UI map manager 300. In this illustrative diagram, an error is identified within UI control 304. The tooltip 306 displays the error.

Tooltips displayed for errors associated with UI controls may provide details about the control specific issues.

The system, in this illustrative diagram, may identify that a locator value was not provided for the control 'WebEdit_1' 304, as shown at 306. Every UI control requires a locator value to be provided. The UI control within the AUT may not function when the locator value is not provided.

Figure 4:
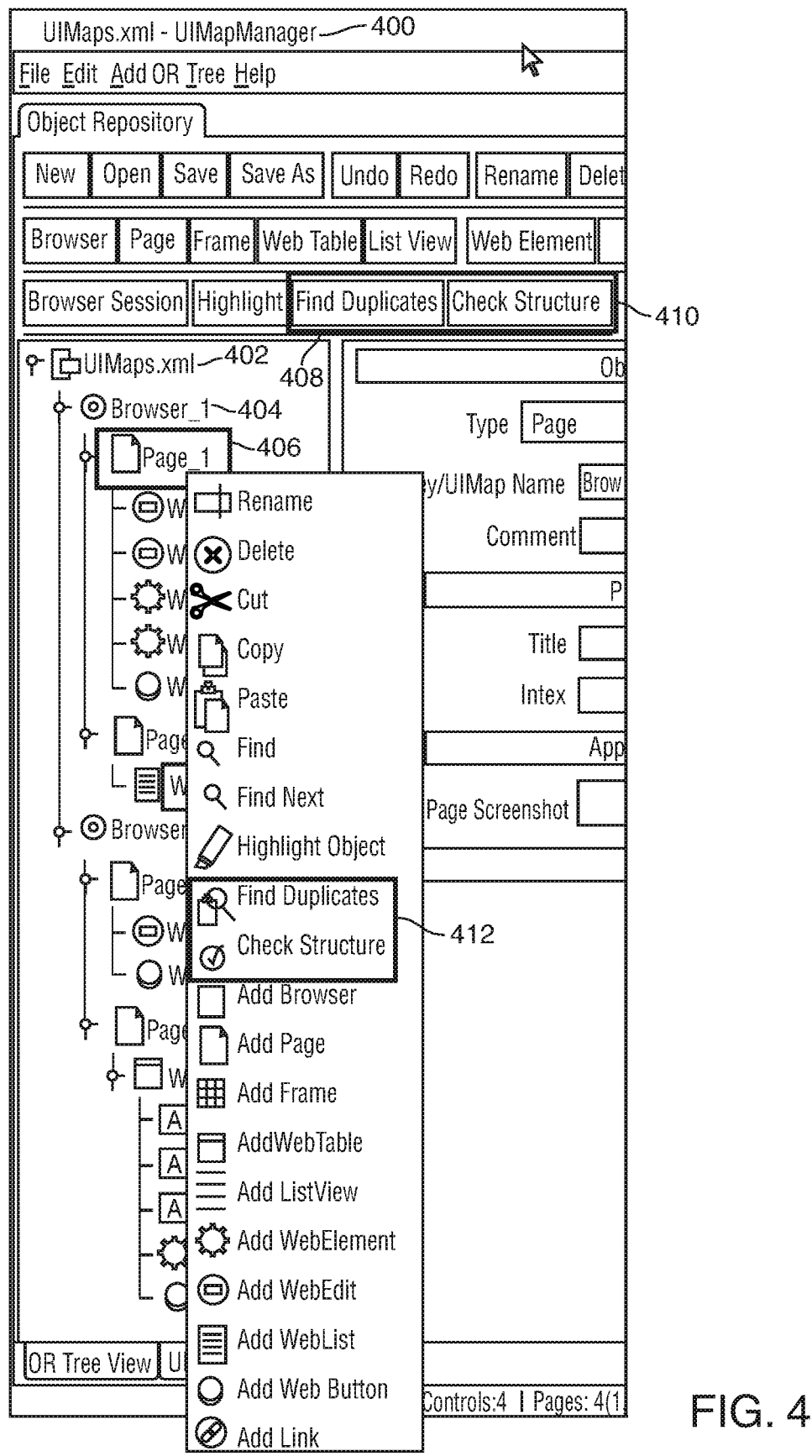
FIG. 4 shows an exemplary portion of a UI in accordance with principles of the invention.

FIG. 4 shows an illustrative diagram of a portion of a UI map 402 within a UI map manager 400. This diagram displays an interactive mode for health validation of the OR. Interactive health validation may enable getting detailed cumulative health information at each of the root level 402, browser level 404 and page level 406. The health validation may provide information separately for both the structure of the UI controls and the duplicate UI controls.

Interactive health validation may be triggered via selection of the top toolbar buttons including the 'find duplicates' button 408 and the 'check structure' button 410. The validation may also be triggered on a right-click of the selected root, browser, or page, as shown at 412. Because OR's typically have many pages and hundreds of UI controls, when the validation is executed at the root level 402 or the browser level 404, the report of the errors may be generated in a file and not as a tooltip.

An exemplary report of errors generated from a 'check structure' may be displayed below at table 2.

TABLE 2

========OR structure check for UIMaps.xml root starts ===========
========OR structure check for Browser_1 browser starts ==========
Page_1 page
  [ERR] No CORE controls found for this page. There should be at least one CORE
  control for each page.
  [WARN] No controls with LookFor found for this page. Typically LookFor should
  be set at least for one control on a page.
  [ERR] No locator value provided. Please provide the locator value
      WebEdit_1
      WebButton_1
  [ERR] A control that is not supposed to be Auxiliary is marked as such
      WebButton_1
Page_2 page
  [WARN] No controls with LookFor found for this page. Typically LookFor should
  be set at least for one control on a page.
    ======== OR structure check for Browser_1 browser ends ==========

TABLE 2-continued

```
========OR structure check for Browser_2 browser starts ===========
Page_3 page
  [INFO] LookFor target Browser(Browser_2).Page(Page_4) is a page. It is
  recommended to use short names for pages in LookFor.
         WebButton_1
Page_4 page
  [ERR] No CORE controls found for this page. There should be at least one
  CORE control for each page.
  [ERR] Please provide the INFO value for WebTable Column control reflecting
  the column order in the table.
         Column2_Col
         Column3_Col
  [ERR] No _TE control found for the column control
         Column2_Col
         Column3_Col
  [ERR] Please set Category for Table _Col and _TE controls to A-Auxillary
         Column4_TE
  [ERR] No _Col control found for the _TE control
         Column4_TE
  [ERR] LookFor target with the name {Page_5} cannot be found among controls
  on this page and among page names
         Column4_TE
  ===========OR structure check for Browser_2 browser ends ========
  ===========OR structure check for UIMaps.xml root ends ========
```

An exemplary report of errors generated from a 'find duplicates' may be displayed below at table 3.

TABLE 3

```
===========OR Find Duplicates for UIMaps.xml root starts
============
===========OR Find Duplicates for Browser_1 browser starts
============
Page_1 page
element1_id -----> WebElement_1, WebElement_2
Page_2 page
  No duplicates are found for this page
       ===========OR Find Duplicates for Page_1 browser ends
       ==============
       =========== OR Find Duplicates for Browser_2 browser starts
       ==========
Page_3 page
edit1_id -----> WebEdit_1,WebButton_1
Page_4 page
No duplicates are found for this page
       ============OR Find Duplicates for Page_1 browser ends
       ==============
       ============OR Find Duplicates for Page_1 root ends
       =================
```

When the validation is executed at the page level 406, the issues may be shown as a popup tooltip. The popup tooltip at the page level is displayed in FIG. 5.

Figure 5:
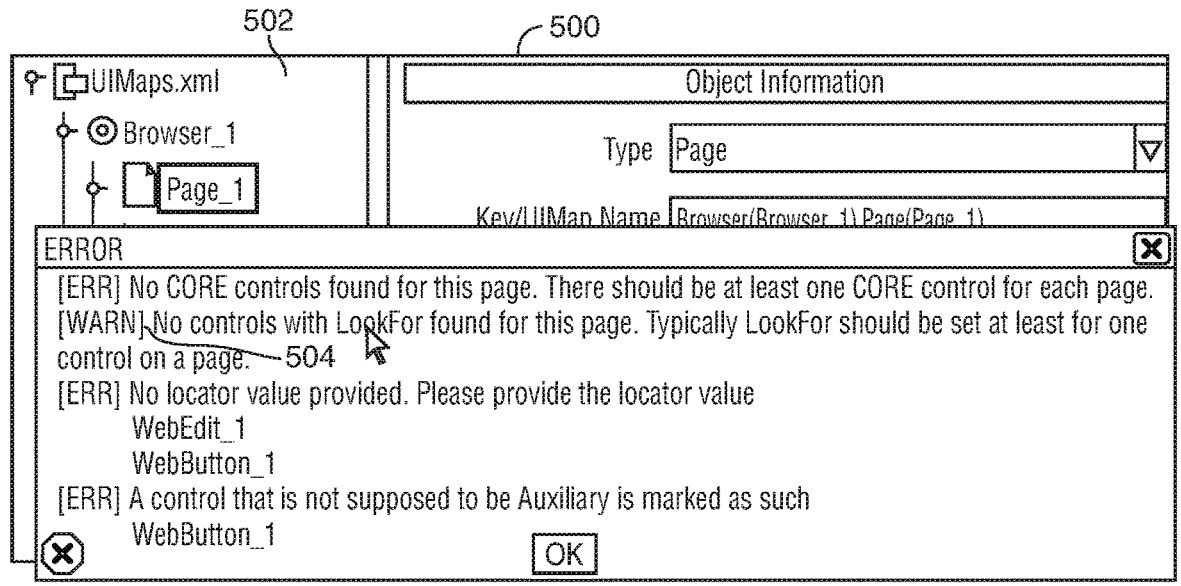
FIG. 5 shows an exemplary portion of a UI in accordance with principles of the invention.

FIG. 5 shows an illustrative diagram of a popup tooltip 504 within the UI map manager 500 for errors found at the page level within UI map 502.

When an interactive check of the structure of the OR is performed, the check structure popup tooltip 504 may display the highest severity level of the found issues for the page i.e.—error, warning and info. The tooltip may provide details about these issues both at the page and control level. Full details of the issues found for the page controls may be displayed. Each found issue may list all controls that may have the issue.

For example, in the popup tooltip 504, a locator value is not provided for two different UI controls. The error is displayed as 'No locator value provided. Please provide the locator value'. Both UI controls that have the error are listed under the error. In this example, controls titled 'webEdit_1' and WebEdit_2' are listed.

Figure 6:
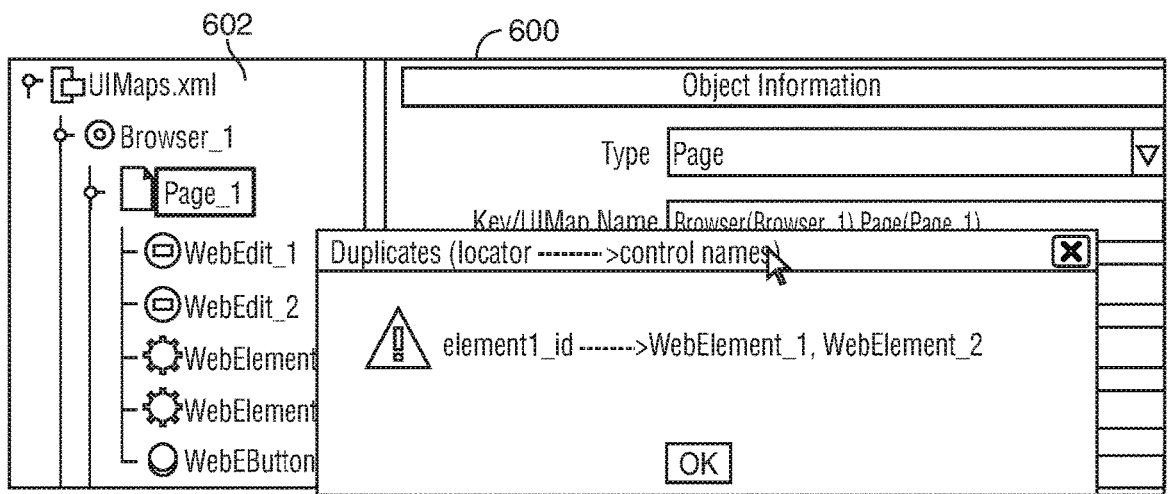
FIG. 6 shows an exemplary portion of a UI in accordance with principles of the invention.

FIG. 6 shows an illustrative popup tooltip 604 displayed within UI map manager 600 for the UI map 602.

When an interactive check for duplicate locator values of the OR is performed, the duplicates popup tooltip 604 may list duplicate UI controls for the page and may display the locator values that the UI controls may share.

In this example, the locator value 'element_1_ID' may be assigned to both controls 'WebElement_1' and 'WebElement_2.'

Figure 7:
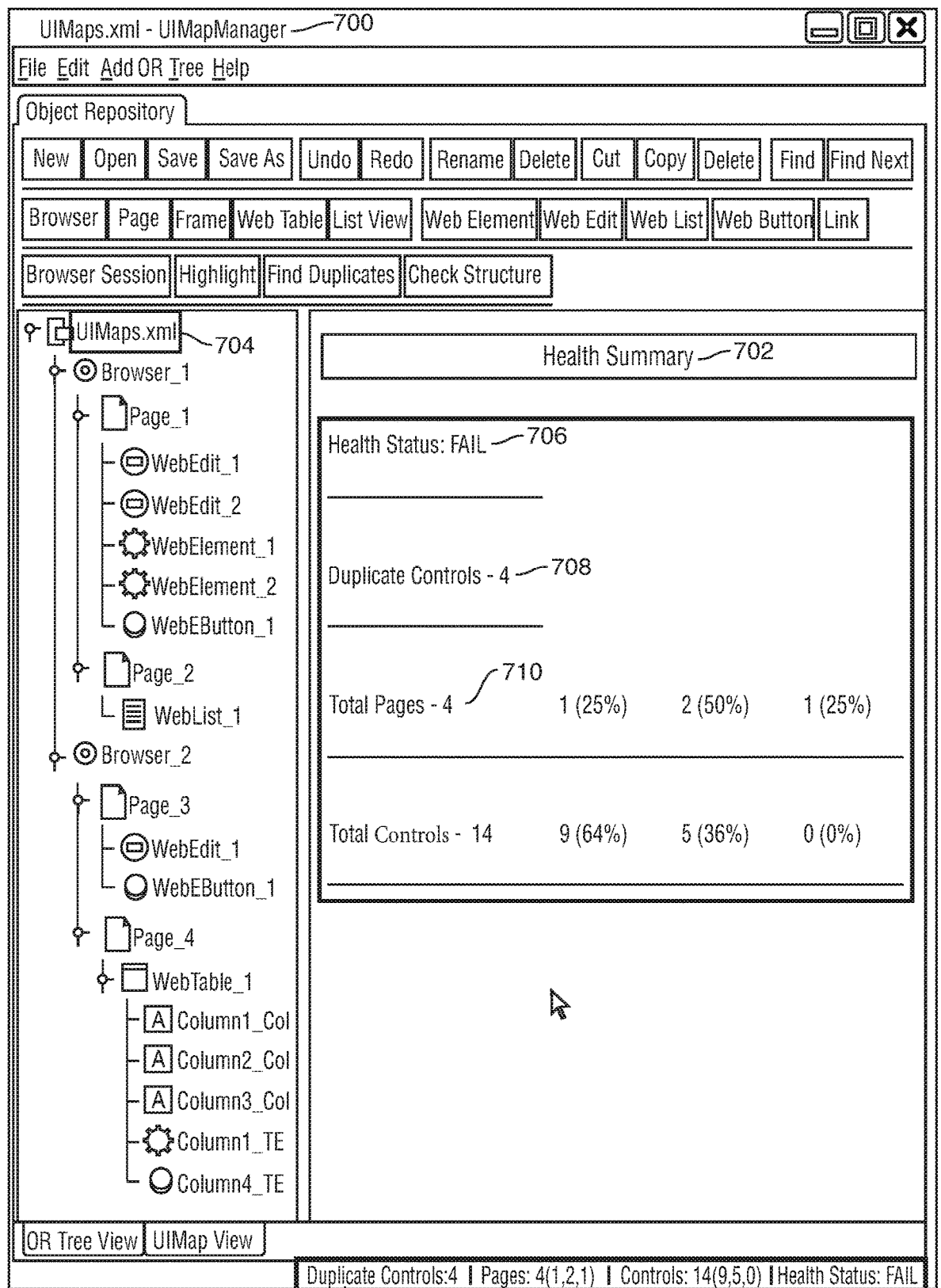
FIG. 7 shows an exemplary UI in accordance with principles of the invention.

FIG. 7 shows an illustrative diagram of the health analytics of the OR. Health analytics may be used to analyze the overall structure of the OR and the UI map and to determine if there are UI controls with duplicate locator values included.

The UI map manager 700 may provide a health summary 702 based off of the automatic and/or interactive health validation performed on the structure of the OR and for the duplicate check performed on the OR.

The health summary 702 may provide a cumulative view of an OR health. The summary may be displayed when the root level is selected, as shown at 704. The health summary 702 may display the overall OR health status 706. The health status may include one of pass, warning or fail.

The health summary 702 may also display the count of UI controls that have duplicate locators, as shown at 708. The health summary 702 may also display the counts and percentages of pages and UI controls in the OR that either pass the check or that may have an error or warning issues found, as shown at 710.

The health summary 702 may also provide analytics at the control level and page level.

A brief summary of the health validation may also be displayed in the toolbar at the bottom of the UI map manager 700, as shown at 712. This toolbar 712 may be visible to the users at all times.

It should be appreciated that the information displayed in the health summary 702 and the toolbar 712 may be updated dynamically, as soon as the health state changes.

Figure 8:
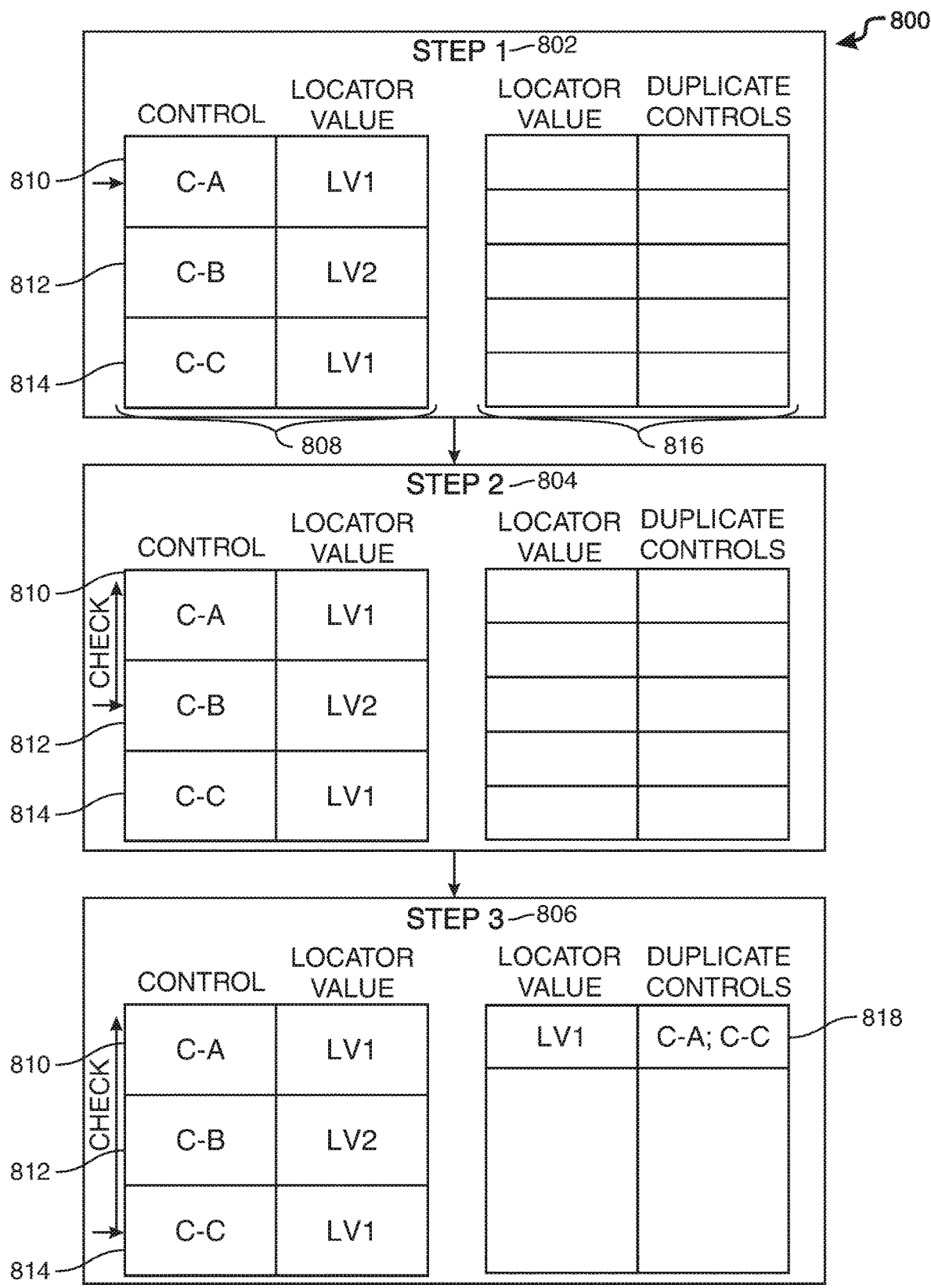
FIG. 8 shows an exemplary diagram in accordance with principles of the invention.

FIG. 8 shows an illustrative exemplary diagram of the process 800 for identifying duplicate locator values in the OR and UI map.

At step 1, shown at 802, a first list 804 may be generated. The first list 808 may display all UI controls and corresponding locator values stored in the OR as tuples. Each tuple may include a control and a corresponding locator value. A check duplicate function may be executed on the first list 808. The check duplicate function may start at the top of the list. The check duplicate function may be an algorithm to find duplicate locator values. The check duplicate function may be coded to check each locator value of a UI control if the identical locator value has already been assigned to a previous control in the list. If there are duplicate locator values, the UI controls that correspond to the duplicate locator values may be identified and stored in a second list 816. Users of the system may be alerted that there are duplicates and may proceed to correct the locator values to include unique locator values. When users are enabled to make these corrections prior to the testing of the AUT, the accuracy of the results of the AUT may be significantly greater.

The first list 808 may include the first three tuples. The first tuple, 810, includes control 'C-A' and corresponding locator value 'LV1.' The second tuple, 812, includes control 'C-B' and corresponding locator value 'LV2.' The third tuple, 814, includes control 'C-C' and corresponding locator value 'LV1.' Record 810 may be the first record in the list and may not have any previous records listed to be used for a comparison. Because the check duplicate function may not be performed on the first tuple, the second list, 816, may not display any duplicate records.

The check duplicate function may proceed to the second tuple in the first list 808, as shown at step 2, 804. Check duplicate function may compare the locator value in the second tuple 812, to the locator value in the first tuple 810. Since the locator value 'LV2' in the second tuple 812 does not match the locator value 'LV1' in the first tuple 810, the check duplicate function may proceed to check the subsequent tuple 814. Data may not be added to the second list 816 since duplicate locator values have not been identified in step 2, 804.

The check duplicate function may proceed to step 3, 806, to check the third tuple 814 to determine if the locator value at 814 is already assigned to a previous UI control. The check duplicate function may compare the locator value in the third tuple 814 'LV1' to the locator value 'LV2' in the previous tuple 812. Since they are not a match, the check duplicate function may proceed to compare the locator value 'LV1' in the first tuple 810. The check duplicate function may identify that the locator values assigned to both controls 'C-A' at 810 and 'C-C' at 814, are duplicates.

Following the identifying of a duplicate locator value, the check duplicate function may proceed to record the duplicate locator value and the UI controls associated with the duplicate locator value, as a record in the second list, 816, as shown at 818. Record 818 may include the locator value 'LV1' and the controls 'C-A' and 'C-C' that are associated with the locator value.

Figure 9:
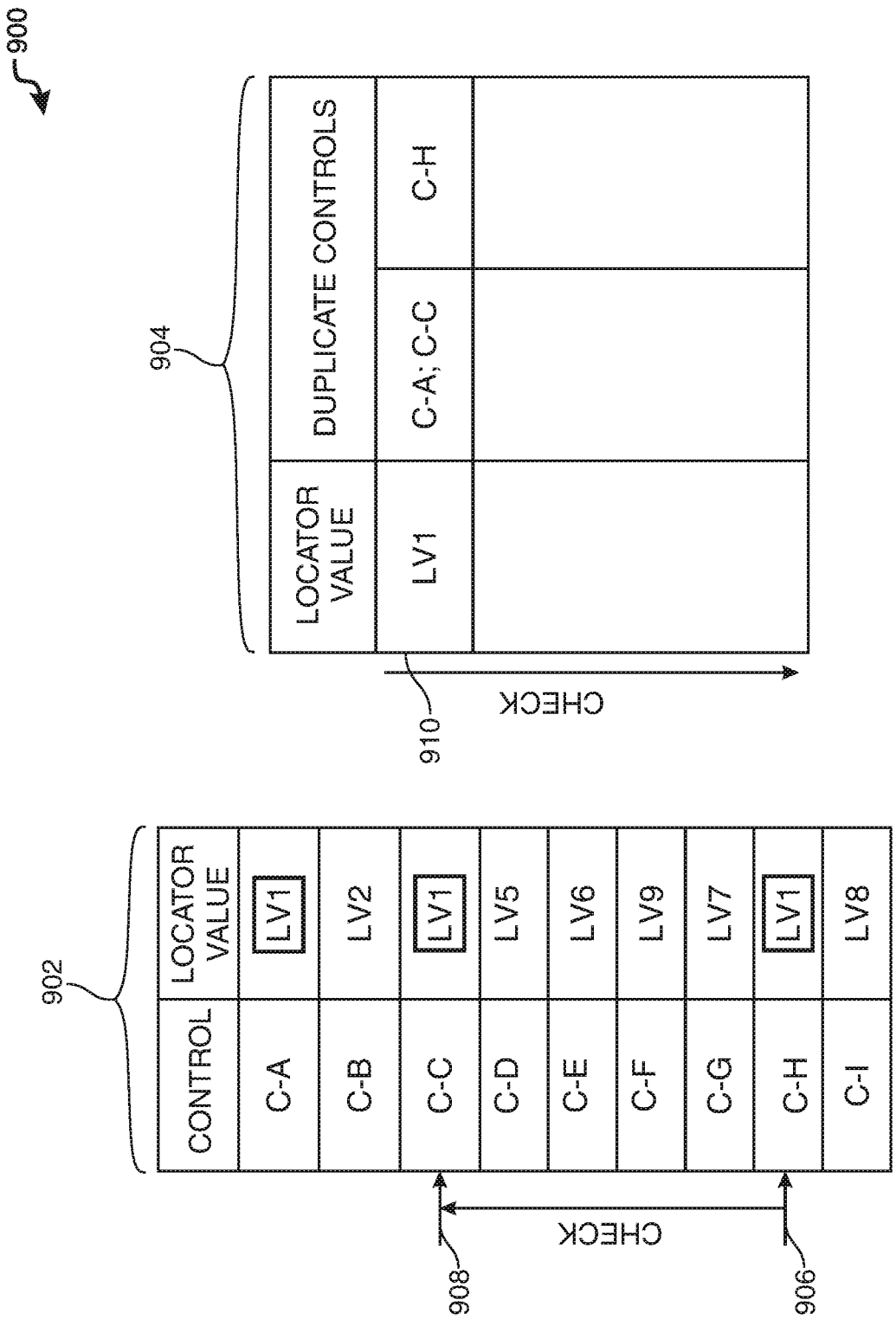
FIG. 9 shows an exemplary diagram in accordance with principles of the invention.

FIG. 9 shows an illustrative exemplary diagram 900 of a continuation in the process shown at FIG. 8, for identifying duplicate locator values in the OR.

The first list 902 may display an expanded list based off of the first list 808 shown in FIG. 8. The first list 902 may include the first three tuples included in list 808 and additional tuples listing additional UI controls associated with the AUT.

The check duplicate function may proceed through each tuple in the first list 902. The function may be pointing at UI control 'C-H' shown at 906. The locator value associated with UI control 'C-H' may be 'LV1.' The check duplicate function may proceed upwards in the list through each previous tuple to identify a matching locator value. At UI control 'C-C' a duplicate locator value is identified. UI Controls 'C-C' and 'C-H' both include the same locator value. Prior to recording the match in the second list 904, the function may include checking the second list to determine whether the locator value has already been recorded for a previous match.

In this example, the locator value 'LV1' has been identified to be included in both UI controls 'C-A' and 'C-C'. The function may include adding the UI control 'C-H' to the previously-recorded record, as shown at 910.

FIG. 10 shows an illustrative diagram of a single-valued map 1002 and a multi-valued map 1004 in accordance with embodiments of the invention.

Single-valued map 1002 may include key-value pairs. The key for each key-value pair in map 1002 may be the UI control. The value for each key-value pair in map 1002 may be the locator value. Since single-valued maps may only include one key and one value for each key-value pair, duplicate locator values may correspond to more than one UI control.

Following the type casting of the single-valued map 1002 to the multi-valued map 1004, the key for each key-value pair in map 1004 may be the locator value and the value for each key-value pair may be the UI control. Additionally the duplicate locator values may be combined as one key in a key-value pair and each UI control corresponding to the locator value may be included in the value of the same key-value pair. The multi-valued map 1004 may enable identifying duplicate locator values efficiently.

Thus, methods and apparatus for testing the controls used to implement a UI of a web application are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for preemptively checking, within a user interlace ("UI") automated testing environment, a plurality of UI controls implemented in a web application, the method comprising:

creating a UI map of the plurality of UI controls and corresponding attributes associated with each UI control, the plurality of UI controls and corresponding attributes stored in an object repository ("OR"), the UI map acting as a basis for one or more automation testing scripts for testing the web application, the UI map mapping a structure of the web application;

accessing the plurality of UI controls and corresponding attributes via a UI map manager associated with the UI map;

storing the UI map in a database associated with the web application;

searching for duplicate locator values in the OR, the searching comprising:

generating a first list comprising a plurality of tuples where each tuple includes a first part comprising a UI control from the plurality of UI controls and a second part comprising the corresponding locator value associated with the UI control;

iterating through each tuple, the iterating comprising, for each tuple, determining whether a locator value in the tuple matches a locator value in one of a previous tuples;

when the locator value in the current tuple does not match the locator value in one of the previous tuples, the method comprises proceeding to a subsequent tuple in the list; and upon determination that the locator value in the current tuple does match the locator value in one olthe previous topics, the method comprises:
    highlighting, on the UI map, the current tuple and the previous topic comprising the matching locator value;
    recording the matching locator value, the UI control from the current tuple and the UT control from the previous tuple comprising the matching locator value as a record in a second list;
    identifying which one of the locator values from the current tuple and from the previous tuple is incorrect;
    overwriting the incorrect locator value with a unique locator value; and
    following the overwriting, automatically committing the unique locator value to the OR to include the unique locator value and automatically reflecting the correction on the UI map; and
testing the web application upon completion of the searching, the testing comprising;
    executing, the automation testing script, the automation testing script retrieving metadata stored within the UI map;
    based on the metadata, implementing a test scenario on the web application; and
    monitoring a response of the web application to the test scenario.

2. The method of claim 1 wherein the searching is performed prior to a testing of the web application.

3. The method of claim 1 wherein when a revision is made in the UI map manager, the method comprises automatically regenerating, in real-time, the first list and repeating the searching for duplicate locator values in the OR based off of the regenerated first list.

4. The method of claim 1 further comprising, prior to the recording, chocking the second list for a previously-recorded record comprising the matching locator value and when the previously-recorded record comprising the matching locator value is found, adding the control included in the first part of the current tuple to the previously-recorded record.

5. The method of claim 1 wherein the UI map is a first UI map corresponding to a first wehpage of the web application and the method further comprises creating an additional UI map for each webpage of the web application.

6. The method of claim 5 wherein the locator value is a first attribute of the UI control and each UI control comprises a second attribute defining a category type for the control, the category type defining a behavior of the UI control.

7. The method of claim 6 further comprising checking a structure of the UI map, the checking comprising:
    confirming that a locator value is provided for each UI control;
    confirming that each of the first UI map and each additional UI map comprises at least one UI control where the category type is defined as a core UI control of the webpage.

8. The method of claim 7 further comprising displaying, in real-time, via the UI map manager:
    a total amount of UI controls comprising duplicate locator values:
    a total amount of identified errors associated with the structure of the OR; and
    a total amount of identified warnings associated with the structure of the OR.

9. The method of claim 8 wherein the UI map comprises a root level, a browser level and a page level, each of the root level, browser level and page level corresponding to a level of the web application, and the method further comprises enabling checking the structure and searching for duplicate locators at each of the root level, browser level and page level.

10. An object repository ("OR") testing system for pre-emptively checking, within a user interface ("UI") automated testing environment, a plurality of controls implemented in a web application, the web application testing system comprising:
    an OR for storing the plurality of UI controls and corresponding attributes associated with each UI control;
    a UI map mapping the plurality of controls and corresponding attributes stored in the OR, each UI map comprising key-value pairs, wherein each key is a UI control included in the webpage and each value is a locator value associated with the UI control;
    a UI map manager for managing the UI controls stored in the OR, the UI map manager configured to:
        generate a first list comprising a plurality of tuples where each tuple corresponds to a key-value pair:
        iterate through each tuple in the list, the iterating comprising, for each tuple, determining whether a locator value in the tuple matches a locator value in one of a previous tuples;
        if the locator value in the current tuple does not match the locator value in one of the previous tupies, proceed to a subsequent tuple in the list;
        if the locator value in the current tuple does match the locator value in one of the previous tuples:
            highlight, on the map, the current tuple and the previous tuple comprising the matching locator value; and
            record the matching locator value and the UI control from the current tuple and the control from the previous tuple comprising the matching locator value as a record in a second list;
            identify which one of the locator values from the current tuple and from the previous triple is incorrect:
            overwrite the incorrect locator value with a unique locator value; and
            following the overwriting, automatically commit the unique locator value to the OR, include the unique locator value and automatically reflect the correction on the UI map; and
    an automation testing, script configured for testing the web application, the testing being executed upon completion of the managing the UI controls and being configured to:
        retrieve metadata stored within the UI map;
        based on the metadata, implement a test scenario on the web application; and
        monitor a response of the web application to the test scenario.

11. The system of claim 10 wherein each locator value comprises a unique locator value.

12. The system of claim 10 wherein the UI map manager includes a UI map editor and when a revision is made within the editor, the UI map manager is further configured to automatically regenerate, in real-time, the first list and repeat the searching for duplicate locator values in the OR based off of the regenerated first list.

13. The system of claim 10 wherein, prior to the recording, the UI map manager is further configured to check the second list for a previously-recorded record comprising the matching locator value and when the previously-recorded record comprising the matching locator value is found, add the control included in the first part of the current tuple to the previously-recorded record.

14. The system of claim 10 wherein the UI map is a first UI map corresponding to a first webpage the web application and the UI map manager is further configured to create an additional UI map for each webpage of the web application.

15. The system of claim 14 wherein the locator value is a first attribute of the UI control and each UI control comprises a second attribute defining a category type for the control, the category type defining a behavior of the UI control.

16. The system of claim 15 wherein the UI map manager is further configured to check a structure of the OR, the checking comprising:
   confirming that a locator value is provided for each UI control;
   confirming that of the first UT map and each additional UI map comprises at least one UI control where the category type is defined as a core UI control of the webpage.

\* \* \* \* \*